(12) United States Patent
Noble et al.

(10) Patent No.: US 11,194,716 B2
(45) Date of Patent: Dec. 7, 2021

(54) INTELLIGENT CACHE PRELOADING

(71) Applicant: INTERNATIONAL BUSINESS MACHINES CORPORATION, Armonk, NY (US)

(72) Inventors: Gary Paul Noble, Worcestershire (GB); Paul Beedham, Bedworth (GB)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 16/840,553

(22) Filed: Apr. 6, 2020

(65) Prior Publication Data

US 2021/0311873 A1    Oct. 7, 2021

(51) Int. Cl.
| | |
|---|---|
| *G06F 12/08* | (2016.01) |
| *G06F 11/07* | (2006.01) |
| *G06F 11/30* | (2006.01) |
| *G06F 9/30* | (2018.01) |
| *G06F 12/0811* | (2016.01) |
| *G06F 12/0891* | (2016.01) |

(52) U.S. Cl.
CPC ...... *G06F 12/0811* (2013.01); *G06F 9/30047* (2013.01); *G06F 11/0772* (2013.01); *G06F 11/302* (2013.01); *G06F 11/3006* (2013.01); *G06F 11/3037* (2013.01); *G06F 12/0891* (2013.01); *G06F 2212/7207* (2013.01)

(58) Field of Classification Search
CPC ............. G06F 12/0811; G06F 11/3006; G06F 11/3037; G06F 11/302; G06F 9/30047; G06F 12/0891; G06F 11/0772; G06F 2212/7207
See application file for complete search history.

(56) References Cited

U.S. PATENT DOCUMENTS

| | | |
|---|---|---|
| 6,370,614 B1 | 4/2002 | Teoman |
| 9,984,088 B1 | 5/2018 | Desai |
| (Continued) | | |

FOREIGN PATENT DOCUMENTS

GR    20170200042 U    5/2018

OTHER PUBLICATIONS

Mell, Peter et al.; "The NIST Definition of Cloud Computing;" National Institute of Standards and Technology; Special Publication 800-145; Sep. 2011; 7 pages.

*Primary Examiner* — Masud K Khan
(74) *Attorney, Agent, or Firm* — Schmeiser, Olsen & Watts; Michael A. Petrocelli

(57) ABSTRACT

A method, system, and program product for implementing intelligent cache preloading is provided. The method includes monitoring current usage of a system of record (SOR) system. Historical data associated with historical usage of the SOR system is retrieved and analyzed based on the current usage. A ranked list of data items configured to be loaded within a cache structure of the cache system is generated and currently requested data items from the SOR system are loaded into the cache structure via a throttling process. A malfunction associated with operation of the SOR system is detected and access to the currently requested data items is enabled. The currently requested data items are organized within the cache structure in accordance with an order of the ranked list and access to the currently requested data items is enabled, during the malfunction, in accordance with the order of the ranked list.

20 Claims, 7 Drawing Sheets

(56) References Cited

U.S. PATENT DOCUMENTS

| | | |
|---|---|---|
| 10,009,439 B1 | 6/2018 | Kolam |
| 10,178,147 B1 | 1/2019 | Kolam |
| 2015/0193524 A1* | 7/2015 | Williams .............. G06F 21/577 707/740 |
| 2018/0097905 A1 | 4/2018 | Todasco |
| 2018/0285472 A1 | 10/2018 | Krutzler |
| 2019/0050278 A1* | 2/2019 | Bangad ............... G06F 11/0793 |
| 2020/0409711 A1* | 12/2020 | Constable ........... G06F 9/30047 |

* cited by examiner

INTELLIGENT CACHE PRELOADING

BACKGROUND

The present invention relates generally to a method for intelligently preloading a cache structure in a cache system and in particular to a method and associated system for improving software and cache memory technology associated with monitoring usage of a system of record (SOR) system and loading associated data items into a cache structure of the cache system for enabling access to the data items during a malfunction of the SOR system.

SUMMARY

A first aspect of the invention provides an intelligent cache preloading method comprising: monitoring, by a processor of a hardware device executing a pre-loader component of a cache system, current usage of a system of record (SOR) system; retrieving, by the processor, historical data associated with historical usage of the SOR system; analyzing, by the processor, the historical data and results of the monitoring; generating, by the processor based on results of the analyzing, a ranked list of data items configured to be loaded within a cache structure of the cache system; loading, by the processor, currently requested data items from the SOR system into the cache structure via execution of a throttling process for gradually enabling system restoration; detecting, by the processor, a malfunction associated with operation of the SOR system; enabling, by the processor during the malfunction, access to the currently requested data items; organizing, by the processor during the malfunction, the currently requested data items within the cache structure in accordance with an order of the ranked list; and enabling, by the processor during the malfunction, access to the currently requested data items in accordance with the order of the ranked list.

A second aspect of the invention provides a computer program product, comprising a computer readable hardware storage device storing a computer readable program code, the computer readable program code comprising an algorithm that when executed by a processor of a hardware device implements an intelligent cache preloading method, the method comprising: monitoring, by the processor executing a pre-loader component of a cache system, current usage of a system of record (SOR) system; retrieving, by the processor, historical data associated with historical usage of the SOR system; analyzing, by the processor, the historical data and results of the monitoring; generating, by the processor based on results of the analyzing, a ranked list of data items configured to be loaded within a cache structure of the cache system; loading, by the processor, currently requested data items from the SOR system into the cache structure via execution of a throttling process for gradually enabling system restoration; detecting, by the processor, a malfunction associated with operation of the SOR system; enabling, by the processor during the malfunction, access to the currently requested data items; organizing, by the processor during the malfunction, the currently requested data items within the cache structure in accordance with an order of the ranked list; and enabling, by the processor during the malfunction, access to the currently requested data items in accordance with the order of the ranked list.

A third aspect of the invention provides a hardware device comprising a processor coupled to a computer-readable memory unit, the memory unit comprising instructions that when executed by the processor implements an intelligent cache preloading method comprising: monitoring, by the processor executing a pre-loader component of a cache system, current usage of a system of record (SOR) system; retrieving, by the processor, historical data associated with historical usage of the SOR system; analyzing, by the processor, the historical data and results of the monitoring; generating, by the processor based on results of the analyzing, a ranked list of data items configured to be loaded within a cache structure of the cache system; loading, by the processor, currently requested data items from the SOR system into the cache structure via execution of a throttling process for gradually enabling system restoration; detecting, by the processor, a malfunction associated with operation of the SOR system; enabling, by the processor during the malfunction, access to the currently requested data items; organizing, by the processor during the malfunction, the currently requested data items within the cache structure in accordance with an order of the ranked list; and enabling, by the processor during the malfunction, access to the currently requested data items in accordance with the order of the ranked list.

The present invention advantageously provides a simple method and associated system capable of accurately preloading a cache structure in a cache system.

DETAILED DESCRIPTION

Figure 1:
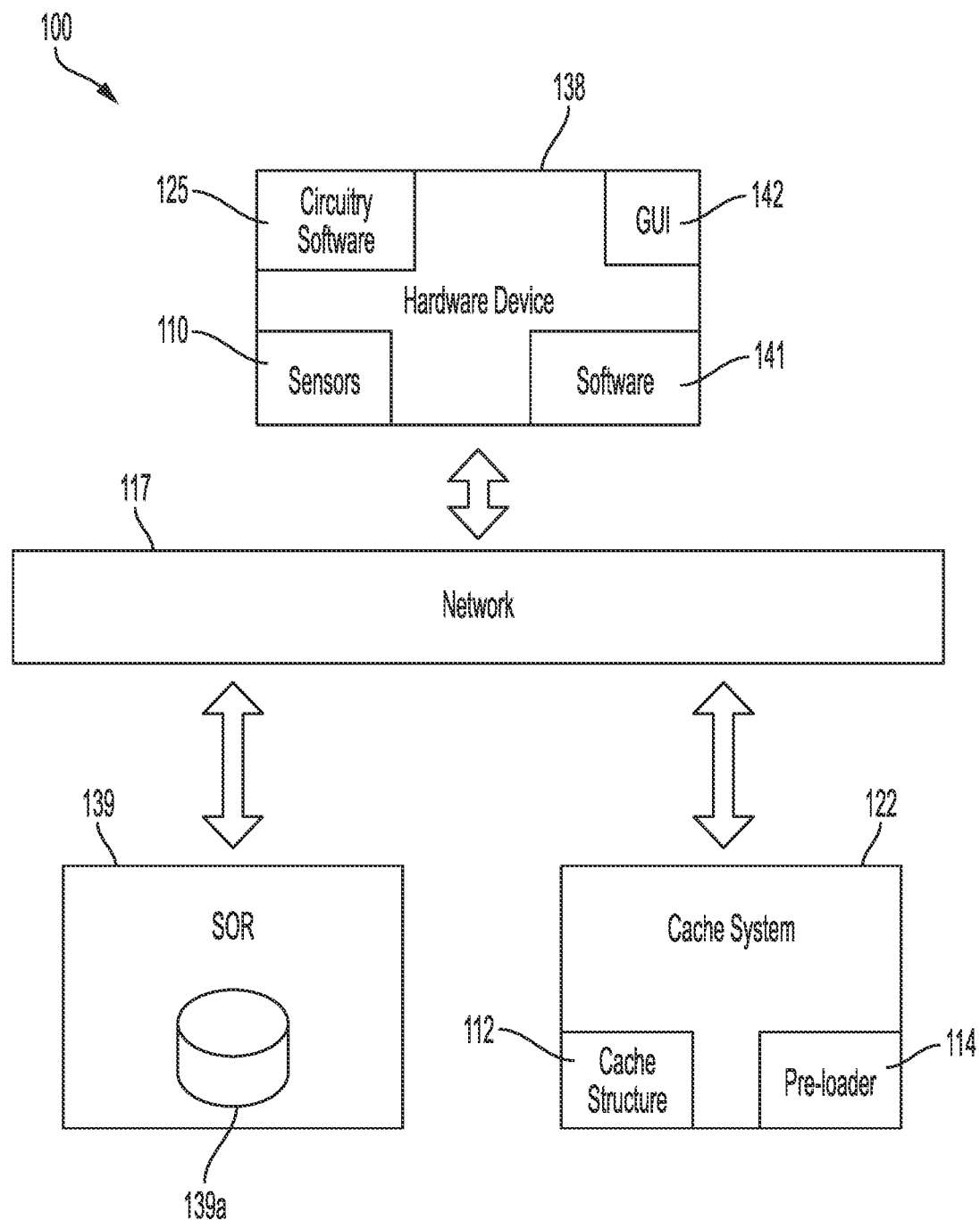
FIG. 1 illustrates a system for improving software and cache memory technology associated with monitoring usage of a system of record (SOR) system and loading associated data items into a cache structure for enabling access to the data items during a malfunction of the SOR system, in accordance with embodiments of the present invention.

FIG. 1 illustrates a system 100 for improving software and cache memory technology associated with monitoring usage of a system of record (SOR) system 139 and loading associated data items 139a into a cache structure 112 of a cache system 122 for enabling access to the data items 139a during a malfunction of the SOR system 139, in accordance with embodiments of the present invention. Typical high volume and high performance systems are often required to cache data, at an application layer, to achieve timely end user response times. Likewise, SOR systems do not typically anticipate large volumes driven by internet and b2b channels. Additionally, typical SOR systems struggle to support transaction rates driven by an increase in open interfaces that drive new information channels (e.g., internet banking, ticketing systems, etc.). Likewise, execution of large volumes of new data requests may cause issues resulting from long code paths and interconnections downstream resulting in further degradation of the system. Traditional caching approaches may result in a bottleneck as a result of multiple data storage approaches. For example, starting with empty caches and relying on a data driven population may cause performance challenges with respect to system startups as high user demand peaks are achieved. Prepopulating a cache directly from a suite of SOR's may create additional complexity and effort and impact performance. Additionally, prepopulating a cache directly from a suite of SOR's significantly impacts codebases managing data and constraints with respect to access. Therefore, system 100 enables a process for pre-populating a cache structure thereby enabling a fast response time for anticipated usage patterns.

System 100 comprises a pre-loader component 114 and associated interface for providing preload control of data. Pre-loader component 114 is configured to generate a sorted list of items to be loaded into cache structure 112. Pre-loader component 114 is further configured to generate synthetic requests associated with software application requests thereby enabling SOR system 139 to generate a value via cache system 122. The synthetic call allows a process for loading cache system 122 (in accordance with a load balancing process) from a total of all historical requests to prepare for an application call. Pre-loader component 114 is additionally configured to store a record of all items that have been cached. For each cached item (e.g., account data values) and an associated identifier, priority and activity information is recorded. Information within pre-loader component 114 is sorted by priority and associated activity. Priorities may include:

1. 0 priority comprises an immediate priority such as a system requiring prioritization for an item such as system parameters.
2. 1 priority comprises a priority associated with an occurring write change such as another external system has caused a data value to be changed within an SOR and therefore a cache must be cleared and preloaded again.
3. 2 priority comprises a required read event for loading a cache as there is no current cache entry.
4. 9 priority comprises a nothing required priority associated with a value in a cache being fully representative.

System 100 of FIG. 1 includes a hardware device 138 (i.e., specialized hardware or virtualized device), SOR 139, and a cache system 122 interconnected through a network 117. Hardware device 138 may include, inter alia, a computing device, a dedicated device, etc. Hardware device 138 may be Bluetooth enabled to provide connectivity to any type of system. Hardware device 138 includes specialized circuitry/software 125 (that may include specialized software), sensors 110, software 141, and a GUI 142. Sensors 110 may include any type of internal or external sensor (or biometric sensor) including, inter alia, ultrasonic three-dimensional sensor modules, an optical sensor, a video retrieval device, an audio retrieval device, humidity sensors, voltage sensors, a keyboard, a mouse, a touch screen, a temperature sensor, etc. SOR 139 includes a database 139a.

Cache system 122 comprises a cache structure and a pre-loader component (e.g., implemented in software, hardware, etc). Hardware device 138, SOR 139, and cache system 122 may each comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 138, SOR 139, and cache system 122 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software and cache memory technology associated with monitoring usage of a SOR system and loading associated data items into a cache structure of a cache system for enabling access to the data items during a malfunction of the SOR system. Network 117 may be external to hardware device 138, SOR 139, and/or cache system 122 as illustrated in FIG. 1. Alternatively, network 117 may be internal any components of to hardware device 138, SOR 139, and/or cache system 122. Network 117 may include any type of network including, inter alia, a 5G telecom network, a local area network, (LAN), a wide area network (WAN), the Internet, a wireless network, etc. Alternatively, network 117 may include an application programming interface (API).

Figure 2:
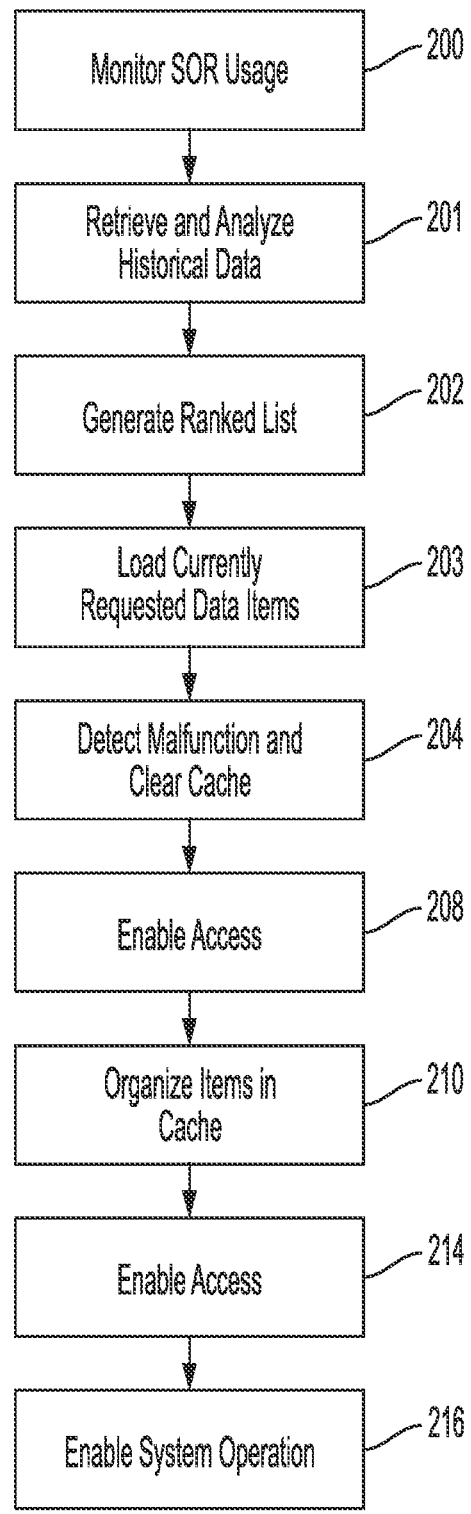
FIG. 2 illustrates an algorithm detailing a process flow enabled by the system of FIG. 1 for improving software and cache memory technology associated with monitoring usage of a SOR system and loading associated data items into a cache structure for enabling access to the data items during a malfunction of the SOR system, in accordance with embodiments of the present invention.

FIG. 2 illustrates an algorithm detailing a process flow enabled by system 100 of FIG. 1 for improving software and cache memory technology associated with monitoring usage of a SOR system and loading associated data items into a cache structure of a cache system for enabling access to the data items during a malfunction of the SOR system, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 138, SOR 139, and cache system 122. In step 200, current usage of (SOR) system is monitored via execution of a pre-loader component of a cache system. Monitoring usage of the SOR system may include: monitoring software system usage of the SOR system; monitoring hardware system usage of the SOR system; monitoring users of the SOR system; and/or monitoring hardware and software systems accessing the SOR system.

In step 201, historical data associated with historical usage of the SOR system is retrieved and analyzed based on results of step 200. In step 202, a ranked list of data items configured to be loaded within a cache structure of the cache system is generated based on the analysis of step 201. In step 203, currently requested data items from the SOR system are loaded into the cache structure. The data items may be loaded into the cache structure via execution of a throttling process such that system restoration is executed gradually. The currently requested data items may be loaded into the cache structure in response to detecting that the hardware device is currently operating in an idle state. Loading the currently requested data items from the SOR into the cache structure may include:
1. Populating the cache structure with data identified by a pre-loader component of the cache system.
2. Identifying a totality of the data with respect to usage.
3. Identifying a next index for usage based on evaluating meta data of the data.
4. Detecting an updated state of the hardware device.
5. Storing (within the cache structure) data values associated with the current state of the hardware device.
6. Marking an associated index value (within the pre-loader component) as complete.
7. Identifying a next available index value.

The updated state of the hardware device may include, inter alia, a busy state, an overload state, an idle state, etc. Loading the currently requested data items from the SOR into the cache structure may alternatively include clearing the cache system and preloading associated metadata within the cache system.

In step 204, a malfunction associated with operation of the SOR system is detected. Detecting the malfunction may include:
1. Detecting a software malfunction associated with operation of a portion of the SOR system.
2. Detecting a hardware malfunction associated with operation of a portion of the SOR system.

Additionally, the cache structure may be cleared in step 204. In step 208, access to the currently requested data items is enabled during the malfunction. In step 210, the currently requested data items are organized (during the malfunction) within the cache structure in accordance with an order of the ranked list. In step 214, access to the currently requested data items is enabled in accordance with the order of the ranked list. In step 216, operation of system 100 is enabled with respect to normal operational functionality.

Figure 3:
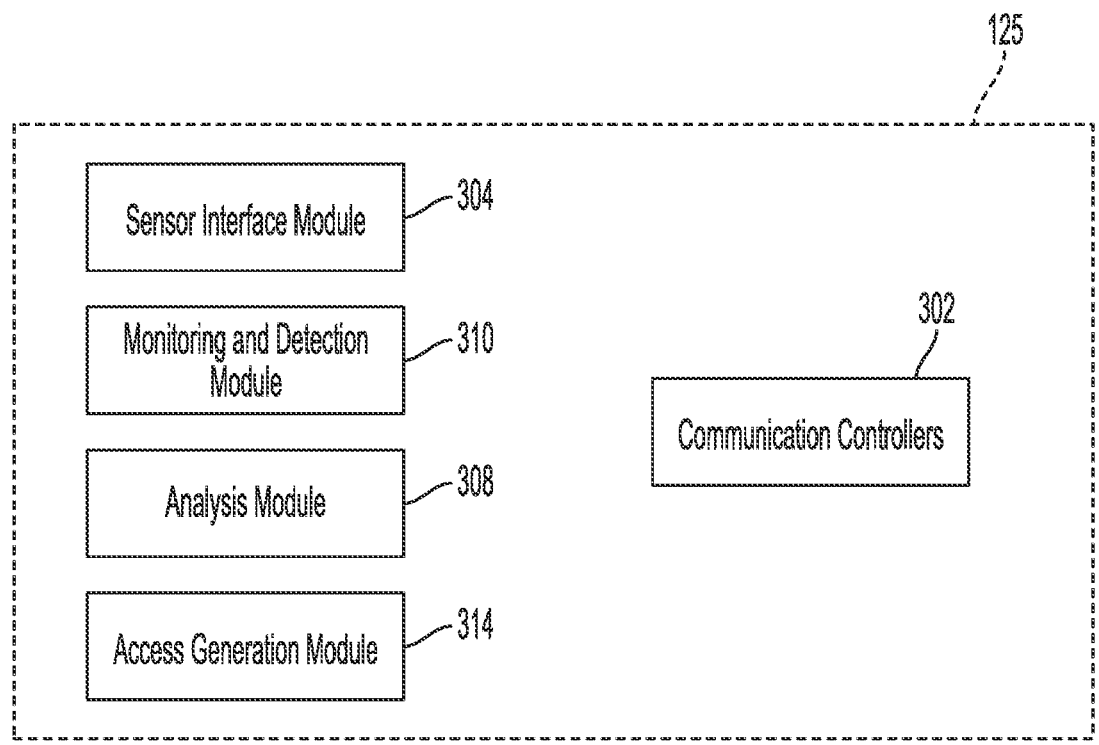
FIG. 3 illustrates an internal structural view of the circuitry/software of FIG. 1, in accordance with embodiments of the present invention.

FIG. 3 illustrates an internal structural view of circuitry/software 125 of FIG. 1, in accordance with embodiments of the present invention. Circuitry/software 125 may comprise hardware, software, and/or virtual components. Circuitry/software 125 includes a sensor interface module 304, monitoring and detection module 310, an analysis module 308, an access generation module 314, and communication controllers 302. Sensor interface module 304 comprises specialized hardware and software for controlling all functions related to sensors 110 of FIG. 1. Monitoring and detection module 310 comprises specialized hardware and software for controlling all functionality related to monitoring and detection processes for implementing the process described with respect to the algorithm of FIG. 2. Analysis module 308 comprises specialized hardware and software for controlling all functions related to the analysis steps of FIG. 2. Access generation module 314 comprises specialized hardware and software for controlling all functions related to enabling access to requested data items in accordance with the algorithm of FIG. 2. Communication controllers 302 are enabled for controlling all communications between sensor interface module 304, monitoring and detection module 310, analysis module 308, and access generation module 314.

Figure 4:
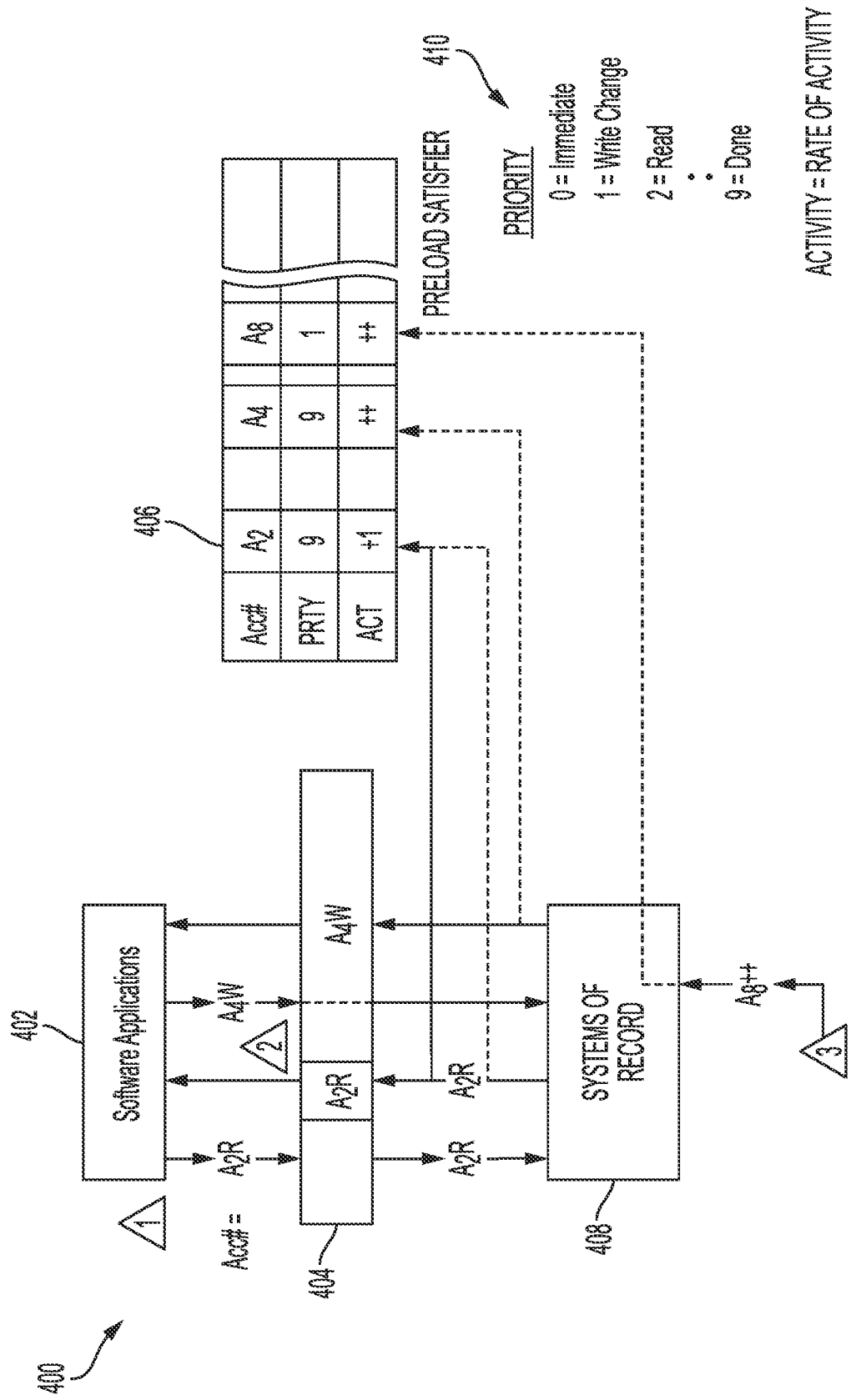
FIG. 4 illustrates a caching system for enabling a process for populating a cache structure, in accordance with embodiments of the present invention.

FIG. 4 illustrates an example of a caching system 400 for enabling a process for populating a cache structure 404, in accordance with embodiments of the present invention. Caching system 400 includes software applications 402, cache structure 404, a pre-loader queue 406 comprising a data structure, a SOR structure 408, and a priority list 410 for loading cache structure 404. Cache structure 404 is configured to store a value A2r (account2Read). Pre-loader queue 406 comprises a data structure maintained to specify priorities with respect to a preload process such that if cache structure 404 is dropped (i.e., disconnected), the cache population process is initiated. Software applications 402 may include, inter alia, conventional software applications, mobile device applications, 3rd party system applications, etc. Cache structure 404 is configured to store an index value (e.g., an account number) and a last returned value. During a system shutdown, cache structure 404 clears an internal memory. Likewise, pre-loader queue 406 stores a set of data that includes index values and associated meta data with respect to usage for all index values. The process for populating a cache structure includes:

Enabling software applications 402 to submit a call for a missing value from cache structure 404 such that a call is submitted to SOR 408 and returned to cache structure 404. Additionally, a metadata indexer (MI) is passed to pre-loader queue 406 and a value retrieved from SOR 408 is passed back to software applications 402. Additionally, an application (of software applications 402) updating a missing data record generates a resulting update that is passed to SOR 408. A resulting notification (indicating the update within SOR 408) is transmitted to pre-loader queue 406 enabling the MI to be updated for future usage. An associated value is additionally returned to cache structure 404 for enabling a read process and an update value is returned to the application. Any access to SOR 408 is logged from cache structure 404 such that associated metrics may be gathered. A key indicator is generated. The key indicator indicates that the application may not generate the change but enables pre-loader to initiate a process for populating cache structure 406.

The following processes further detail an overall process for repopulating cache structure 404:

During an initial startup process (in response to a full system reset) cache structure 404 and pre-loader queue 406 are emptied and all associated values are set to zero thereby enabling cache structure 404 and pre-loader queue 406 to be accessible execution of functional calls as described, infra. Subsequently, updates to preload data are persisted in the event of system failure and cache structure is always cleared during a system failure or restart.

Caching system 400 further enables application requests to be read from SOR via cache structure 404. In response, it is determined if cache structure 404 comprises an entry for an index value. If cache structure 404 comprises an entry for the index valve then the entry is returned to an application. Additionally, cache structure 404 transmits a message to pre-loader queue 406. The message indicates that a read operation has executed and that the pre-loader queue may increment activity data (e.g., counts, date/time, etc.). If cache structure 404 does not comprise an entry for the index value, SOR 408 is accessed to retrieve an associated value for placement within cache structure 404. In response, cache structure 404 transmits a message to pre-loader queue 406. The message indicates that a read operation has executed and pre-loader queue 406 may increment activity data (counts, date/time, etc.).

Caching system 400 enables the application to perform a write to SOR 408 via cache structure 404. If cache structure is detected to include a value for an index value, then the value is deleted and a call is transmitted to SOR 408 to retrieve the value. Subsequently, SOR 408 is accessed for retrieving the value for placement within cache structure 404 and cache structure transmits a subsequent message to pre-loader queue 406. The message indicates that a write operation has been executed and pre-loader queue 406 is configured to increment activity data. In response, cache structure 404 returns the value to the application.

SOR 408 is further configured to modify itself as a result of additional activity. For example, SOR 408 detect (via a trigger) that a value has changed for a given index value. Therefore, pre-loader queue 406 receives a message indicating that a write operation has been executed and pre-loader queue may be configured to increment the activity data. Pre-loader queue 406 subsequently performs an update operation with respect to cache structure 404. The update operation updates the index value's value.

During a system idle function associated with pre-loader queue 406 (i.e., the system is not servicing any read/write requests), pre-loader queue 406 will attempt to populate cache structure 404 with data identified by pre-loader queue 406 (i.e., an activity for rebuilding a cache upon a system restart or system failure). Subsequently, pre-loader queue 406 identifies a totality and usage characteristics of data used. Pre-loader queue 406 further identifies a next index to be used based on analyzed meta data. Pre-loader queue 406 subsequently analyzed a current system state (e.g., is SOR 408 busy, overloaded, or idle) based upon the values and pre-loader cache 406 waits for a predetermined time period. When the predetermined time period has elapsed, pre-loader queue initializes a request from SOR 408 for the data value and places the data value within cache structure 404. Cache structure 404 marks the data value as done (within pre-loader queue 406) identifies a next data value to be used. If the system is busy or applications are currently making requests the marked data value will be prioritized. The aforementioned process is repeated until all values within pre-loader queue 406 have been marked as complete.

A process for repopulating cache structure 404 during system failure of SOR 408 (or during application specific problems) is enabled when the system is started. In response, cache structure 404 is cleared and all priority metadata is set to a state of: not done thereby causing pre-loader queue 406 (in idle mode) to initiate a preload function with respect to cache structure 404. An end result of the process includes enabling applications to be serviced after a system failure. If additional free time is detected, cache structure 404 may be pre-populated (with meta data) in a controlled manner.

Figure 5:
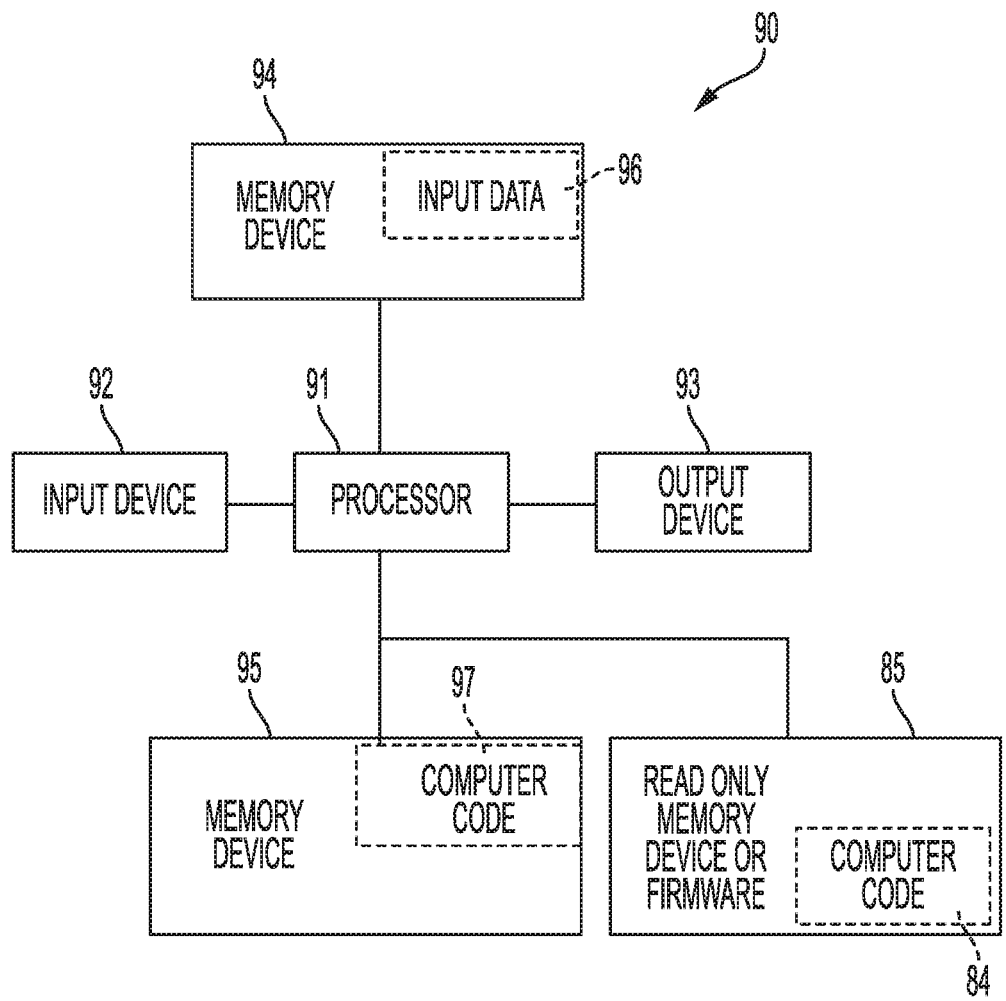
FIG. 5 illustrates a computer system used by the system of FIG. 1 for improving software and cache memory technology associated with monitoring usage of a system of record (SOR) system and loading associated data items into a cache structure for enabling access to the data items during a malfunction of the SOR system, in accordance with embodiments of the present invention.

FIG. 5 illustrates a computer system 90 (e.g., SOR system 139, hardware device 138, and/or Cache system 122 of FIG. 1) used by or comprised by the system of FIG. 1 for improving software and cache memory technology associated with monitoring usage of a SOR system and loading associated data items into a cache structure for enabling access to the data items during a malfunction of the SOR system, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, a network device 72 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and cache memory technology associated with monitoring usage of a SOR system and loading associated data items into a cache structure for enabling access to the data items during a malfunction of the SOR system. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device). The networking device 72 is a device designed to communicate with other computer systems over networks commonly known as local area networks, wide area networks, campus area networks, and metropolitan area networks, using physical links such as, inter alia, wired, optical, or wireless, using data link protocols such as TCP/IP, UDP, ATM, Frame Relay, etc.

In some embodiments, rather than being stored and accessed from a hard drive, optical disc or other writeable, rewriteable, or removable hardware memory device 97, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and cache memory technology associated with monitoring usage of a SOR system and loading associated data items into a cache structure for enabling access to the data items during a malfunction of the SOR system. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and cache memory technology associated with monitoring usage of a SOR system and loading associated data items into a cache structure for enabling access to the data items during a malfunction of the SOR system. In another embodiment, the invention provides a business method that performs the process steps of the invention on a subscription, advertising, and/or fee basis. That is, a service supplier, such as a Solution Integrator, could offer to enable a process for improving software and cache memory technology associated with monitoring usage of a SOR system and loading associated data items into a cache structure for enabling access to the data items during a malfunction of the SOR system. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
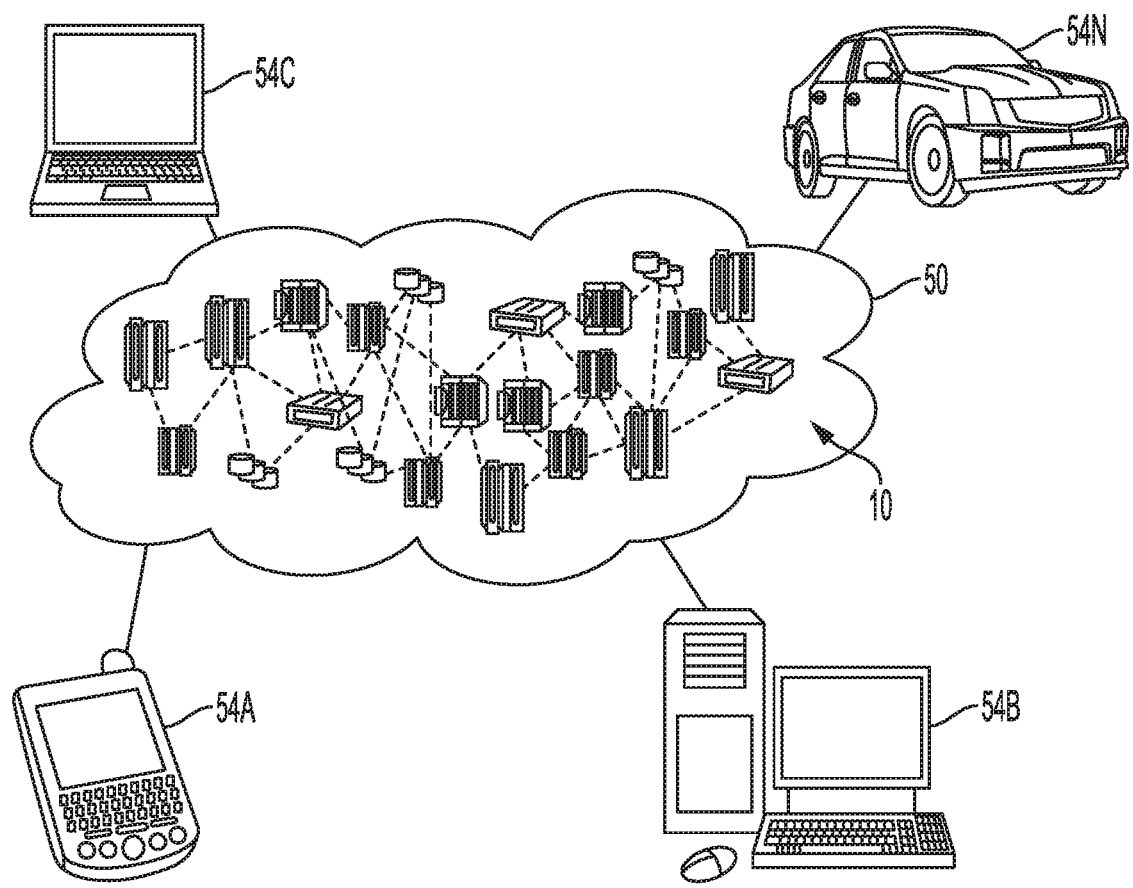
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
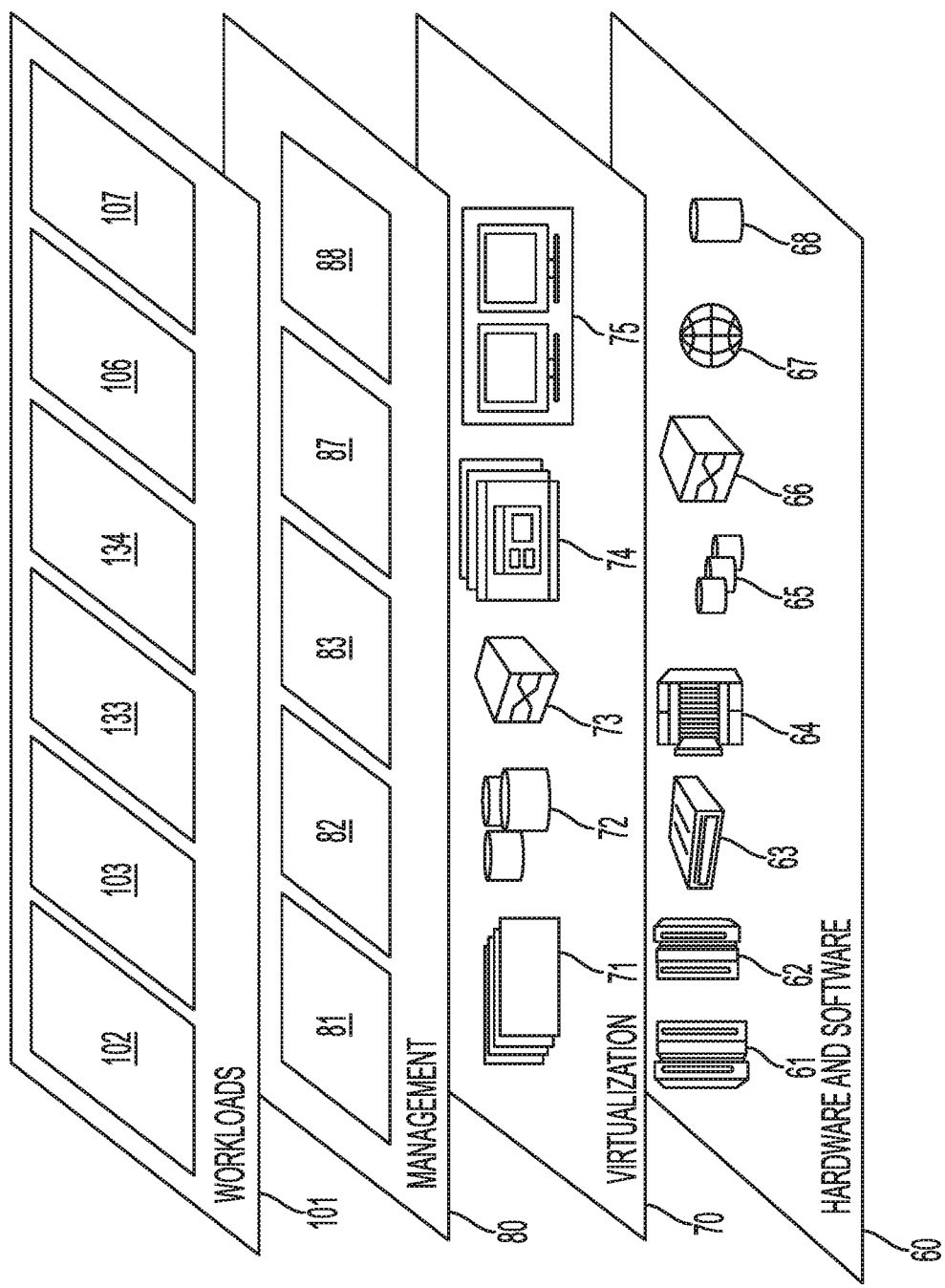
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software and cache memory technology associated with monitoring usage of a SOR system and loading associated data items into a cache structure for enabling access to the data items during a malfunction of the SOR system 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An intelligent cache preloading method comprising:
   monitoring, by a processor of a hardware device executing a pre-loader component of a cache system, current usage of a system of record (SOR) system;
   retrieving, by said processor, historical data associated with historical usage of said SOR system;
   analyzing, by said processor, said historical data and results of said monitoring;
   generating, by said processor based on results of said analyzing, a ranked list of data items configured to be loaded within a cache structure of said cache system;
   loading, by said processor, currently requested data items from said SOR system into said cache structure, wherein said loading is executed via execution of a throttling process for gradually enabling system restoration;
   detecting, by said processor, a malfunction associated with operation of said SOR system;
   enabling, by said processor during said malfunction, access to said currently requested data items;
   organizing, by said processor during said malfunction, said currently requested data items within said cache structure in accordance with an order of said ranked list;
   enabling, by said processor during said malfunction, access to said currently requested data items in accordance with said order of said ranked list;
   detecting, by said processor, that said hardware device is currently operating in an idle state, wherein said loading said currently requested data items from said SOR system into said cache structure comprises;
   populating, said cache structure with data identified by a pre-loader component of said cache system; and
   identifying, a totality of said data with respect to usage.

2. The method of claim 1, wherein said monitoring comprises:
   monitoring software system usage of said SOR system.

3. The method of claim 1, wherein said monitoring comprises:
   monitoring hardware system usage of said SOR system.

4. The method of claim 1, wherein said monitoring comprises:
   monitoring users of said SOR system.

5. The method of claim 1, wherein said monitoring comprises:
   monitoring hardware and software systems accessing said SOR system.

6. The method of claim 1, wherein said detecting said malfunction comprises:
   detecting a software malfunction associated with operation of a portion of said SOR system.

7. The method of claim 1, wherein said detecting said malfunction comprises:
   detecting a hardware malfunction associated with operation of a portion of said SOR system.

8. The method of claim 1, further comprising:
   after said detecting said malfunction, clearing by said processor, said cache structure before loading said currently requested data items.

9. The method of claim 1,
   wherein said loading said currently requested data items from said SOR system into said cache structure further comprises;
   identifying, a next index for usage based on evaluating meta data of said data;
   detecting an updated state of said hardware device;
   storing within said cache structure, data values associated with said current state of said hardware device;
   marking, an associated index value, within said pre-loader component, as complete; and
   identifying, a next available index value.

10. The method of claim 9, wherein said updated state comprises a state selected from the group consisting of a busy state, an overload state, and an idle state.

11. The method of claim 9, wherein said loading said currently requested data items from said SOR system into said cache structure further comprises:
   clearing, said cache system;
   preloading, associated metadata within said cache system.

12. The method of claim 1, further comprising:
   providing at least one support service for at least one of creating, integrating, hosting, maintaining, and deploying computer-readable code in the control hardware, said code being executed by the computer processor to implement: said monitoring, said retrieving, said analyzing, said generating, said loading, said detecting, said enabling to said currently requested data items, said organizing, and said enabling said access to said currently requested data items in accordance with said order of said ranked list.

13. A computer program product, comprising a computer readable hardware storage device storing a computer readable program code, said computer readable program code comprising an algorithm that when executed by a processor of a hardware device implements an intelligent cache preloading method, said method comprising:
   monitoring, by said processor executing a pre-loader component of a cache system, current usage of a system of record (SOR) system;
   retrieving, by said processor, historical data associated with historical usage of said SOR system;
   analyzing, by said processor, said historical data and results of said monitoring;
   generating, by said processor based on results of said analyzing, a ranked list of data items configured to be loaded within a cache structure of said cache system;
   loading, by said processor, currently requested data items from said SOR system into said cache structure via execution of a throttling process for gradually enabling system restoration;
   detecting, by said processor, a malfunction associated with operation of said SOR system;
   enabling, by said processor during said malfunction, access to said currently requested data items;
   organizing, by said processor during said malfunction, said currently requested data items within said cache structure in accordance with an order of said ranked list;
   enabling, by said processor during said malfunction, access to said currently requested data items in accordance with said order of said ranked list;
   detecting, by said processor, that said hardware device is currently operating in an idle state, wherein said loading said currently requested data items from said SOR system into said cache structure comprises;
   populating, said cache structure with data identified by a pre-loader component of said cache system; and
   identifying, a totality of said data with respect to usage.

14. The computer program product of claim 13, wherein said monitoring comprises:
   monitoring software system usage of said SOR system.

15. The computer program product of claim 13, wherein said monitoring comprises:
   monitoring hardware system usage of said SOR system.

16. The computer program product of claim 13, wherein said monitoring comprises:
   monitoring users of said SOR system.

17. The computer program product of claim 13, wherein said monitoring comprises:
   monitoring hardware and software systems accessing said SOR system.

18. The computer program product of claim 13, wherein said detecting said malfunction comprises:
   detecting a software malfunction associated with operation of a portion of said SOR system.

19. The computer program product of claim 13, wherein said detecting said malfunction comprises:
   detecting a hardware malfunction associated with operation of a portion of said SOR system.

20. A hardware device comprising a processor coupled to a computer-readable memory unit, said memory unit comprising instructions that when executed by the processor implements an intelligent cache preloading method comprising:
   monitoring, by said processor executing a pre-loader component of a cache system, current usage of a system of record (SOR) system;
   retrieving, by said processor, historical data associated with historical usage of said SOR system;
   analyzing, by said processor, said historical data and results of said monitoring;
   generating, by said processor based on results of said analyzing, a ranked list of data items configured to be loaded within a cache structure of said cache system;
   loading, by said processor, currently requested data items from said SOR system into said cache structure via execution of a throttling process for gradually enabling system restoration
   detecting, by said processor, a malfunction associated with operation of said SOR system;
   enabling, by said processor during said malfunction, access to said currently requested data items;
   organizing, by said processor during said malfunction, said currently requested data items within said cache structure in accordance with an order of said ranked list;
   enabling, by said processor during said malfunction, access to said currently requested data items in accordance with said order of said ranked list;
   detecting, by said processor, that said hardware device is currently operating in an idle state, wherein said loading said currently requested data items from said SOR system into said cache structure comprises;
   populating, said cache structure with data identified by a pre-loader component of said cache system; and
   identifying, a totality of said data with respect to usage.

* * * * *